United States Patent [19]
Koh

[11] Patent Number: 4,596,418
[45] Date of Patent: Jun. 24, 1986

[54] VEHICLE COVER

[76] Inventor: Chang Y. Koh, #7-1002 Kwang Chang Apt., 1-123 Yeoido-Dong, Yungdungpo-Ku, Seoul, Rep. of Korea

[21] Appl. No.: 676,212

[22] Filed: Nov. 28, 1984

Related U.S. Application Data

[63] Continuation of Ser. No. 434,425, Oct. 14, 1982, abandoned.

[51] Int. Cl.$^4$ .......................... B60J 11/00; B60R 7/02
[52] U.S. Cl. .................... 296/136; 296/37.16; 296/76; 150/52 K; 224/309
[58] Field of Search ............. 296/136, 98, 141, 37.16, 296/140, 95 C, 95 R, 100, 76; 224/309, 318, 329; 135/88; 160/23 R, 368 S; 150/52 K

[56] References Cited

U.S. PATENT DOCUMENTS

| | | | |
|---|---|---|---|
| 2,048,461 | 7/1936 | Mosgoffian | 150/52 K |
| 2,483,478 | 10/1949 | Smelker | 135/88 |
| 2,570,533 | 10/1951 | Elliott | 150/52 K |
| 2,620,007 | 12/1952 | Keller | 296/136 |
| 2,646,097 | 7/1953 | Gaverth et al. | 150/52 K |
| 3,401,977 | 9/1968 | Schamel | 296/136 |
| 3,473,680 | 10/1969 | Downer | 296/37.1 |
| 3,785,697 | 1/1974 | Dabbs | 296/136 |
| 3,988,032 | 10/1976 | Weinstein | 296/76 |
| 4,209,197 | 6/1980 | Fischer | 296/136 |
| 4,216,989 | 8/1980 | Tackett | 296/136 |
| 4,294,483 | 10/1981 | Ferris | 296/136 |
| 4,355,839 | 10/1982 | Rosen | 296/136 |

FOREIGN PATENT DOCUMENTS

| | | | |
|---|---|---|---|
| 812033 | 7/1949 | Fed. Rep. of Germany | 296/76 |
| 2058696 | 4/1981 | United Kingdom | 296/136 |

Primary Examiner—Robert B. Reeves
Assistant Examiner—Dennis H. Pedder
Attorney, Agent, or Firm—Wenderoth, Lind & Ponack

[57] ABSTRACT

The present invention relates to an arrangement for covering a vehicle having a front, a trunk, an outer surface, and an underside. A cover has a shape corresponding to the outer surface of the vehicle and also has an inside surface, a front, two opposite sides, and a rear. A connecting member is attached to the inside surface at the rear of the cover while a ring member is fixed inside of the trunk of the vehicle. A string fixes the connecting member to the ring member. Hooks are attached to the underside of the vehicle along the two opposite sides of the vehicle while holes, made along edges of the two opposite sides of the cover, secure the cover to the hooks attached to the underside of the vehicle.

2 Claims, 6 Drawing Figures

VEHICLE COVER

This application is a continuation of now abandoned application Ser. No. 434,425, filed Oct. 14, 1982.

BACKGROUND OF THE INVENTION

1. Field of the Invention

The present invention relates to a vehicle cover. More particularly, according to the present invention, it is easy to spread the cover over the vehicle and/or to remove the cover from the vehicle.

2. Description of the Prior Art

According to the prior art, it is very troublesome to envelop the vehicle with the cover and/or to remove the cover from the vehicle.

SUMMARY OF THE INVENTION

According to the present invention, it is notable that the inner side of the rear of the cover contains a connecting member and the connecting member is linked to the inside of the trunk of the vehicle. The edge of the cover in the present invention contains a lot of connecting holes to link the cover to the hooks placed on the vehicle and an elastic gun string is extended along the inside of the edge of the cover for tightly securing the cover over the vehicle.

BRIEF DESCRIPTION OF THE INVENTION

The present invention is illustrated in detail in accordance with the accompanying drawings, as follows.

DETAILED DESCRIPTION OF THE PREFERRED EMBODIMENT

Figure 1:
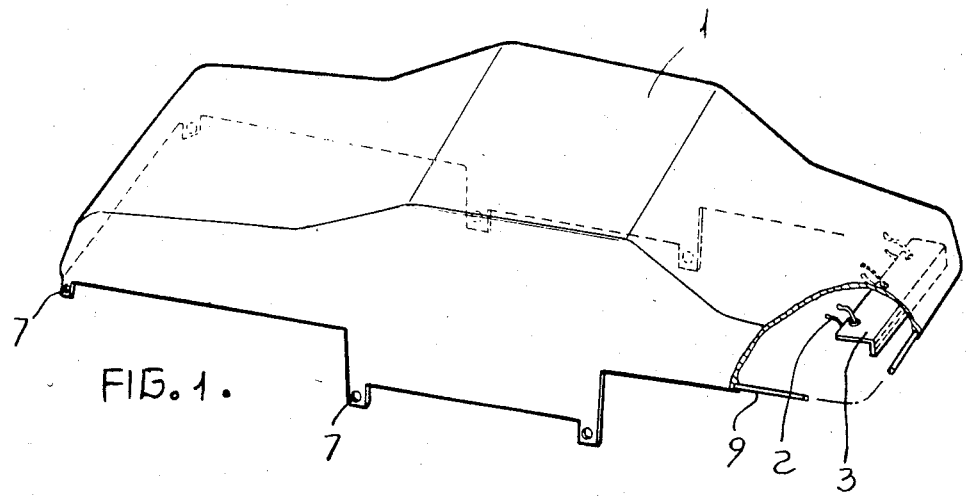
FIG. 1 is the perspective view cut of a part of the cover of the present invention.
Figure 2:
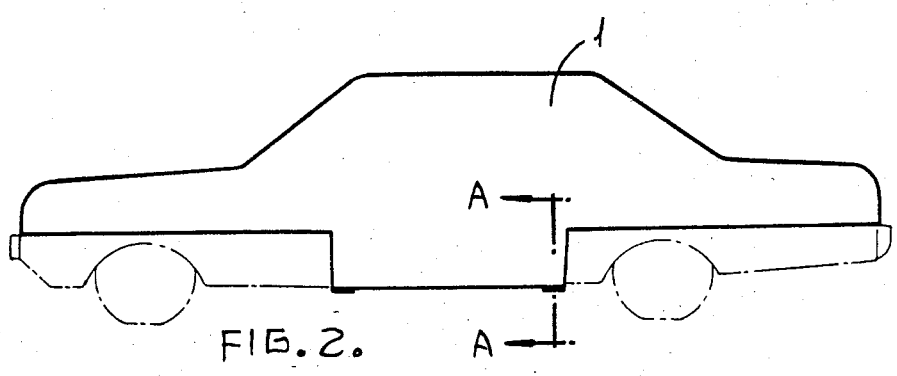
FIG. 2 is the side view of the vehicle with the cover of the present invention.
Figure 4:
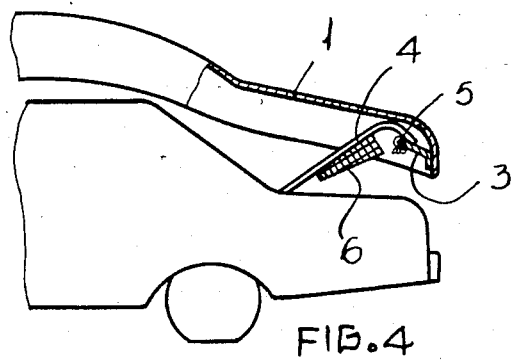
FIG. 4 is the side view cut of a part of the present invention in order to illustrate how the cover is spread over the vehicle.

In FIG. 1, the shape of the cover (1) of the vehicle must be identical to the shape of the vehicle. On the underside at the rear of the cover (1), there is a connecting member (3) made of the same material as the cover (1). Also on the underside of the cover (1), there are fixing strings (2). These strings (2) are tied to a fixed ring member (5) on the inside of a trunk lid (4) of the vehicle and the cover (1) is secured to the ring member (5) fixed to the inside of the trunk lid (4) by the connecting member (3).

On the inside of the trunk lid (4) or on a suitable place in the trunk, there is a pocket (6) into which the cover (1) is folded. When the cover (1) is not used, it is kept in the pocket (6).

In order to envelop the vehicle with the cover (1), the trunk lid (4) is opened first and the cover (1) is pulled out from the pocket (6) and then the vehicle is enveloped with the cover (1). Since the underside of the cover (1) is connected to the inside of the trunk lid (4) of the vehicle, when the trunk lid (4) is shut after the cover (1) is spread over on the vehicle, the cover (1) is stretched tightly over all of the surface of the vehicle.

Figure 3:
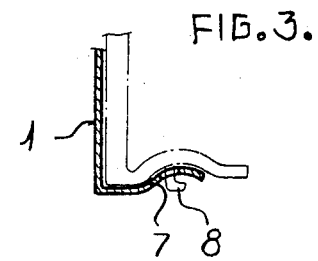
FIG. 3 is the cross-sectional view cut along the line A—A in the FIG. 2.
Figure 5:
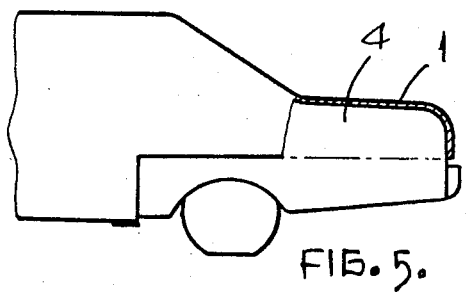
FIG. 5 is the partial side view illustrating a state in which the vehicle is enveloped by the cover of the present invention.
Figure 6:
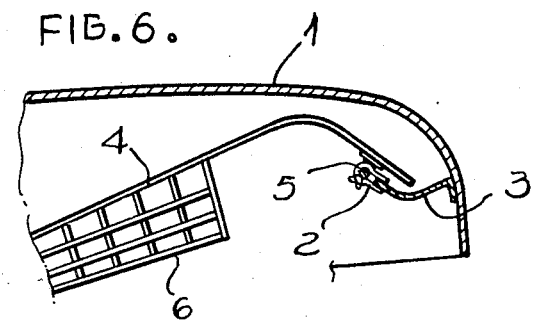
FIG. 6 is the partial cross-sectional view illustrating the state in which the cover is linked to the inside of the trunk in the FIG. 4.

Not only to prevent the cover (1) from fluttering in the wind, but also to spread tightly the cover (1) over the surface of the outer vehicle body, an elastic gum string (9) is placed and extended along the edge of the cover (1). As shown in FIG. 3, the front or the side of the vehicle contains hooks (8) along the two opposite sides of the vehicle and as shown in FIG. 1, the edge of the cover (1) has holes (7) so that it is possible to link the holes (7) to the hooks (8).

According to the present invention, it is easy to spread the cover (1) on the vehicle and/or to remove the cover (1) from the vehicle. When the cover (1) is removed from the vehicle, it is possible to do so by reversing the action of spreading the cover (1) over the vehicle.

I claim:

1. An arrangement means for covering a vehicle having a front, two opposite sides, a rear, a trunk lid at the rear, an outer surface, and an underside, comprising:
    a cover having a shape corresponding to the outer surface of the vehicle, said cover having an inside surface, a front, two opposite sides, and a rear;
    a connecting member attached to the inside surface at the rear of the cover;
    a ring member permanently fixed inside at a rear portion of the trunk lid of the vehicle;
    string means attached to the connecting member and the ring member;
    hooks attached to the underside of the vehicle along the two opposite sides of the vehicle;
    hole means, made along edges of the two opposite sides of the cover, for securing the cover to the hooks attached to the underside of the vehicle;
    hooks attached to the underside of the vehicle along the front of the vehicle;
    hole means, made along the front of the cover, for securing the cover to the hooks attached to the underside along the front of the vehicle;
    pocket means, adapted to be mounted inside of the trunk lid of the vehicle, for storing the cover therein when the cover is not in use on the vehicle; and
    an elastic string extended along edges of the rear of the cover;
    whereby, during removal of the cover from the pocket means, the string means remains attached to the ring member, and whereby, during subsequent spreading of the cover over the vehicle, the rear of the cover is held with the trunk lid open and said cover is tightened over the vehicle when the trunk lid is closed.

2. A combination of a vehicle and a means for covering the vehicle,
    said vehicle having a front, two opposite sides, a rear, a trunk lid at the rear, an outer surface, and an underside,
    said covering means having a shape corresponding substantially to the outer surface of the vehicle and also having an inside surface, a front, two opposite sides, and a rear wherein the improvement comprises:
    a connecting member attached to the inside surface at the rear of the covering means;
    a ring member permanently fixed inside at a rear portion of the trunk lid of the vehicle;

string means attached to the connecting member and the ring member;

hooks attached to the underside of the vehicle along the two opposite sides of the vehicle;

hole means, made along edges of the two opposite sides of the covering means for securing the covering means to the hooks attached to the underside of the vehicle;

hooks attached to the underside of the vehicle along the front of the vehicle;

hole means, made along the front of the cover, for securing the covering means to the hooks attached to the underside along the front of the vehicle;

pocket means, mounted inside of the trunk lid of the vehicle, for storing the covering means therein when the covering means is not in use on the vehicle; and an elastic string extended along edges of the rear of the covering means;

whereby, during removal of the cover from the pocket means, the string means remains attached to the ring member, and whereby, during subsequent spreading of the cover over the vehicle, the rear of the cover is held with the trunk lid open and said cover is tightened over the vehicle when the trunk lid is closed.

* * * * *